Sept. 30, 1947.  E. LABIN ET AL  2,428,118
PULSE MULTIPLEX SYSTEM
Filed April 7, 1944  7 Sheets-Sheet 1
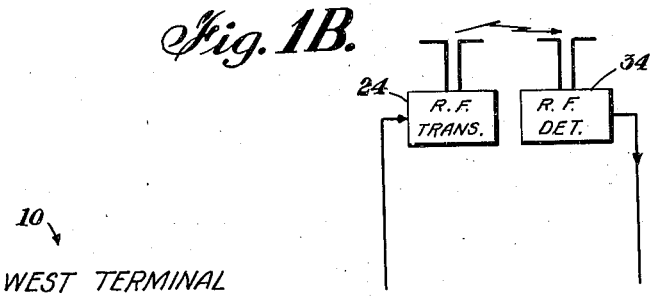
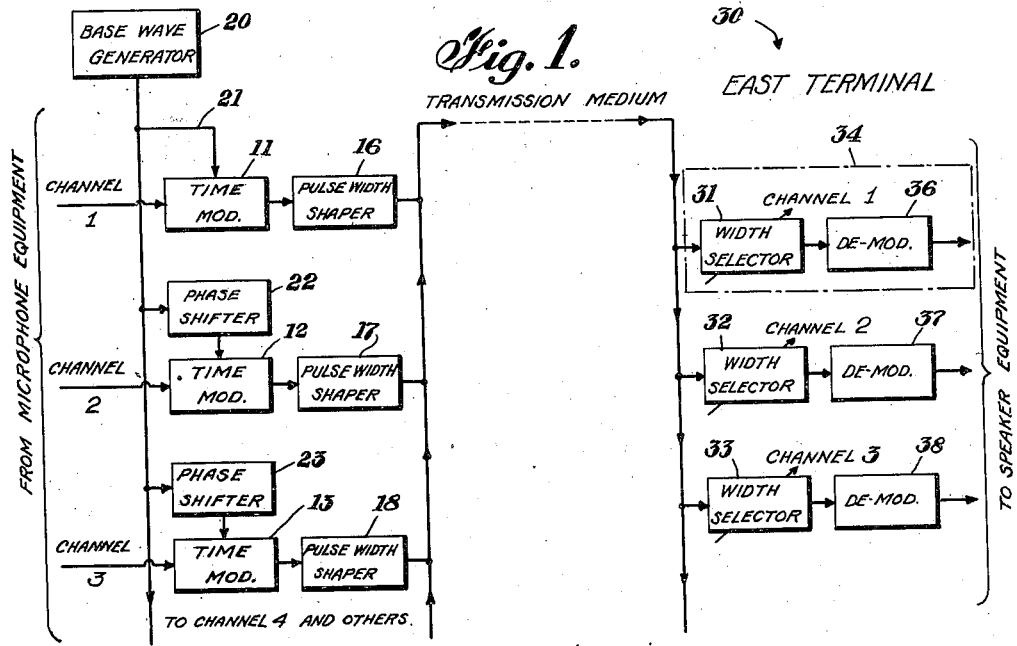
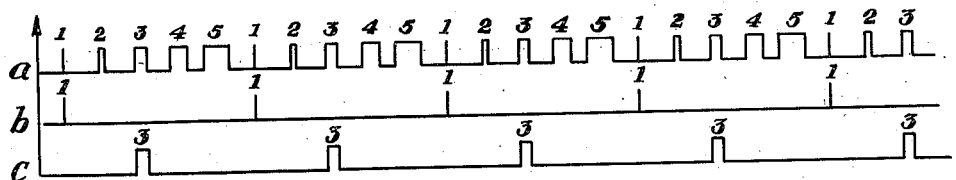
INVENTORS
EMILE LABIN
DONALD D. GRIEG
BY
ATTORNEY Sept. 30, 1947.  E. LABIN ET AL  2,428,118
PULSE MULTIPLEX SYSTEM
Filed April 7, 1944  7 Sheets-Sheet 2
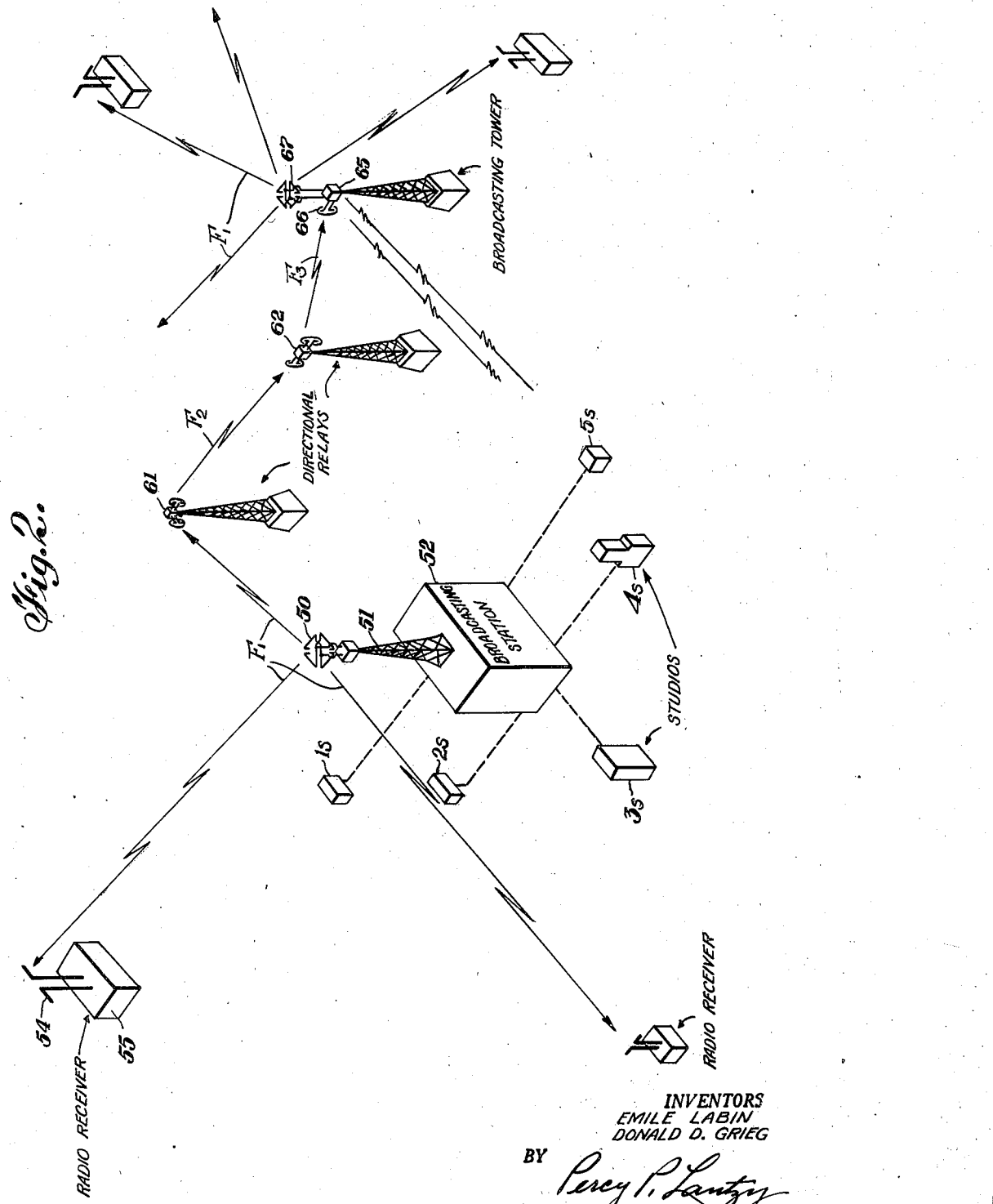
INVENTORS
EMILE LABIN
DONALD D. GRIEG
BY
Percy P. Lantzy
ATTORNEY Sept. 30, 1947.   E. LABIN ET AL   2,428,118

PULSE MULTIPLEX SYSTEM

Filed April 7, 1944   7 Sheets-Sheet 3

INVENTORS
EMILE LABIN
DONALD D. GRIEG
BY
ATTORNEY

Sept. 30, 1947.  E. LABIN ET AL  2,428,118
PULSE MULTIPLEX SYSTEM
Filed April 7, 1944    7 Sheets-Sheet 4
*Fig. 5.*
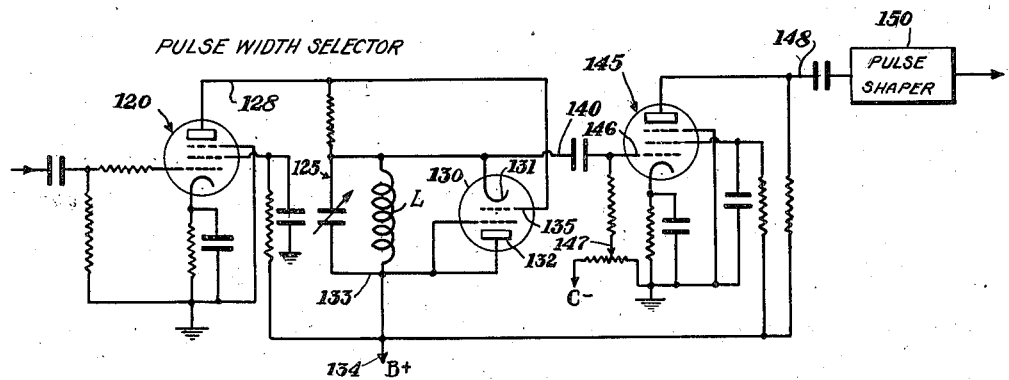
*Fig. 6.*
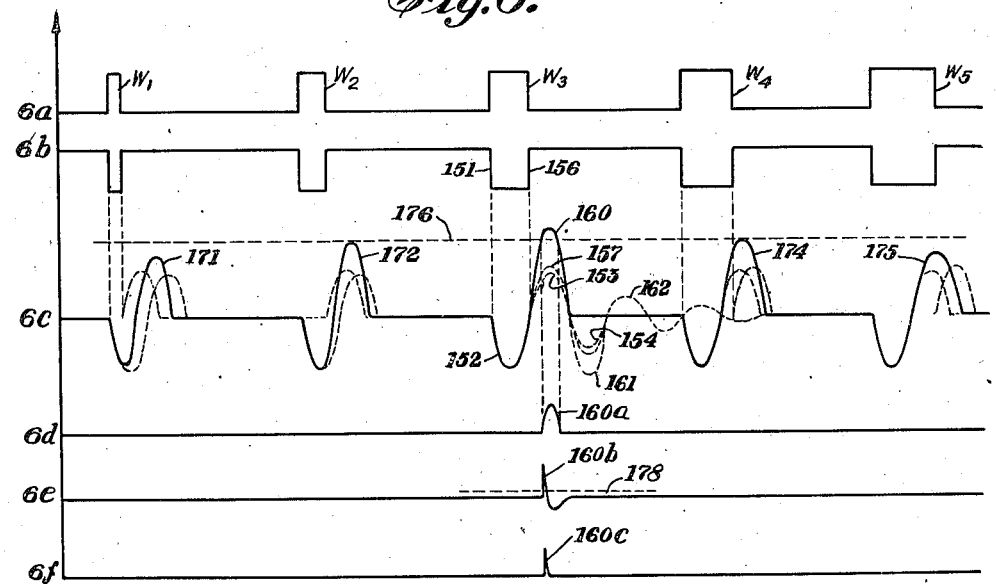
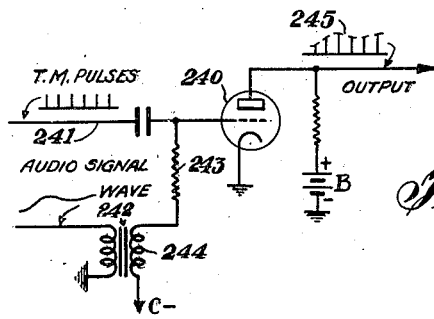
*Fig. 11.*
INVENTORS
EMILE LABIN
DONALD D. GRIEG
BY
Percy P. Lantzy
ATTORNEY Sept. 30, 1947.  E. LABIN ET AL  2,428,118
PULSE MULTIPLEX SYSTEM
Filed April 7, 1944  7 Sheets-Sheet 5

INVENTORS
EMILE - LABIN
DONALD D. GRIEG
BY
*Percy P. Lantry*
ATTORNEY

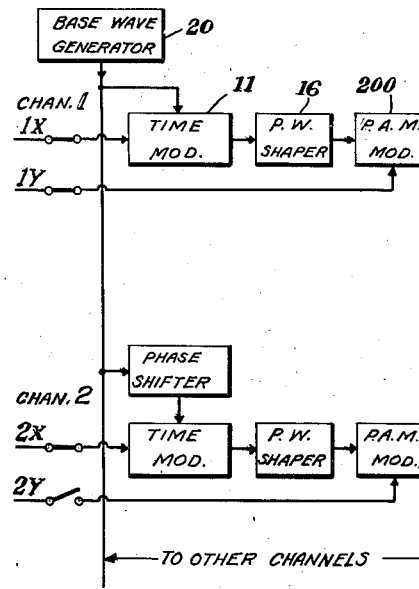
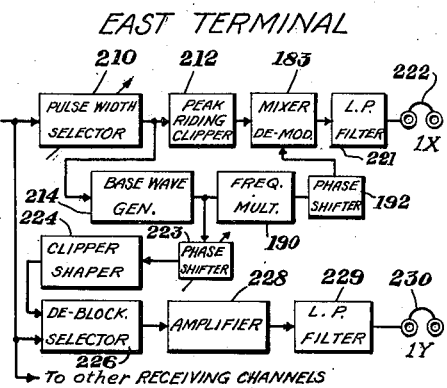
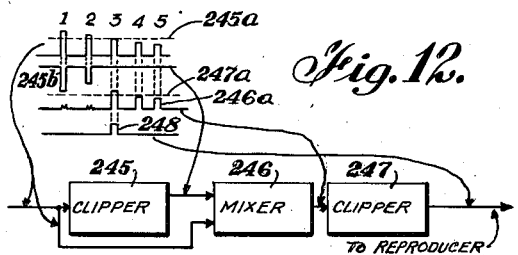
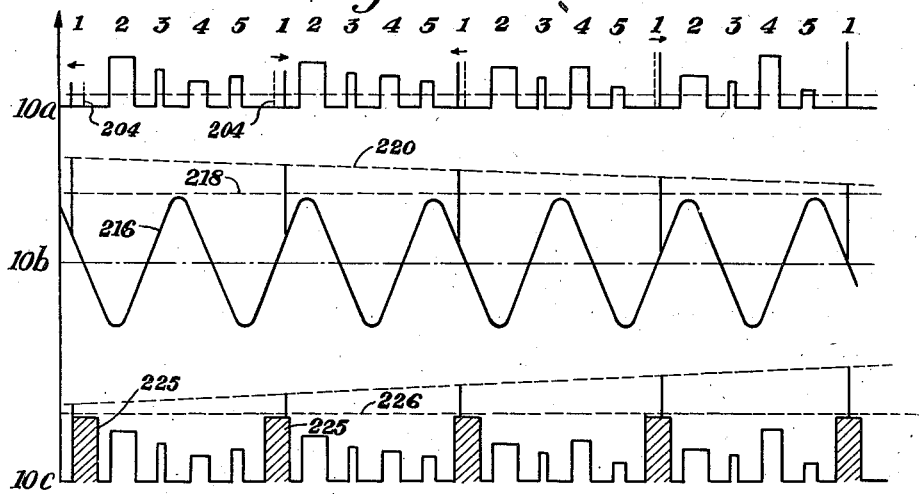

Sept. 30, 1947.  E. LABIN ET AL  2,428,118
PULSE MULTIPLEX SYSTEM
Filed April 7, 1944  7 Sheets-Sheet 7
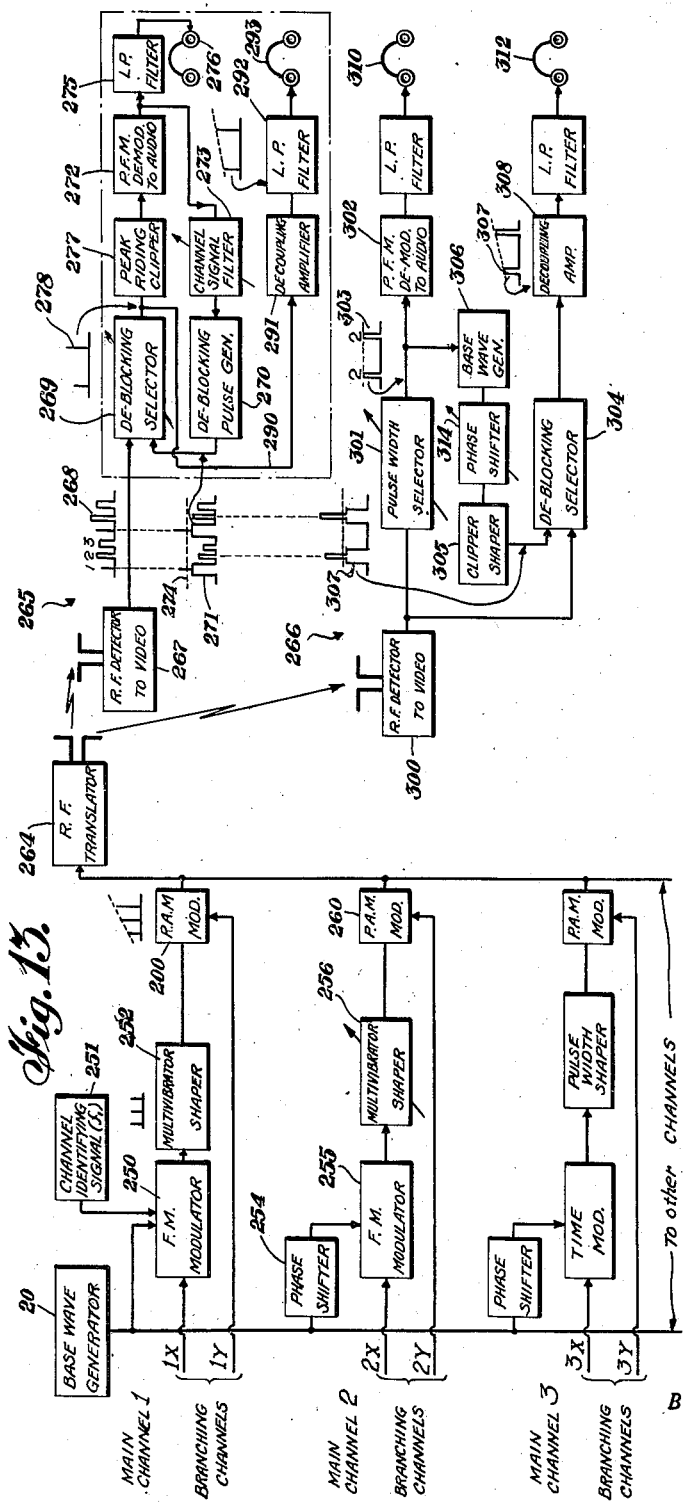
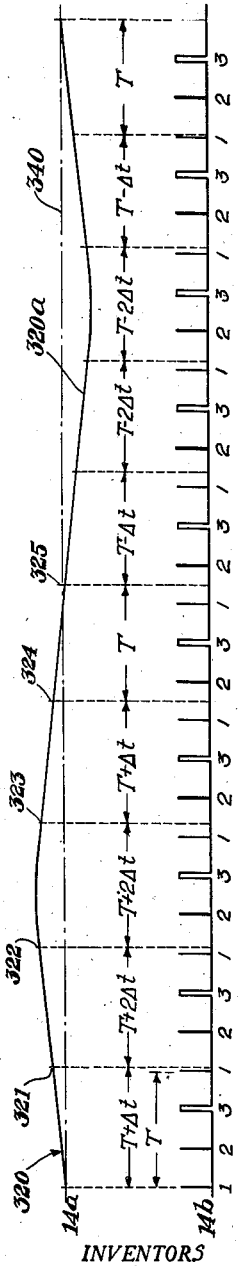
INVENTORS
EMILE LABIN
DONALD D. GRIEG
BY
Percy P. Lantzy
ATTORNEY Patented Sept. 30, 1947

2,428,118

UNITED STATES PATENT OFFICE 2,428,118

PULSE MULTIPLEX SYSTEM

Emile Labin, New York, and Donald D. Grieg, Forest Hills, N. Y., assignors to Federal Telephone and Radio Corporation, New York, N. Y., a corporation of Delaware Application April 7, 1944, Serial No. 529,933

32 Claims. (Cl. 179—15)

This invention relates to multi-channel communication systems and more particularly to multi-channel transmission or broadcasting and selective reception of transmitted channels.

One of the objects of this invention is to provide a method and means for multi-channel communication or broadcasting over a common transmitting medium such as a transmission line or a given carrier frequency wave, as the case may be, the different channels being distinguished by different identifying characteristics or signals.

Another object of the invention is to provide a method and means at receiving points for selectively detecting any one or more of a plurality of signal channels transmitted in timed spaced relation over a common transmission medium such as a transmission line or on a given carrier frequency wave.

Additional objects of the invention include the provision of methods and means for multi-channel pulse transmission and reception wherein different characteristics of the pulses of one or more channels are modulated with different signals; and the different characteristics of the pulses of a given channel are either separately demodulated or are simultaneously demodulated by separate means for simultaneous reproduction.

According to certain features of the invention, the transmission of signals may be "one-way" as in radio broadcasting, or they may be "two-way" as in multi-channel communication between two terminals whether or not the communication is over some form of transmission line or by radio link. The plurality of channels are each constituted by a series of pulses one characteristic of which is modulated with a given identifying signal different from the identifying signals of other channels, and further modulated according to one or another of a plurality of different principles of pulse modulation for transmission of intelligence. The several series of pulses are time controlled so that the pulses of the different channels interleave together to form a single train of pulses for transmission purposes over a common transmission medium to one or more receiving points. At each receiving point is one or more channel selectors adapted to select according to the identifying signals one or more channels and to demodulate the pulses thereof to obtain the intelligence of the respective channels.

The identifying signal for each channel may comprise modulation of some shape characteristic, such as width, amplitude and slope of leading and trailing edges, or the time position or cadence frequency of the pulses by a signal different from the identifying signals of other channels. If desired, different channels may be identified by modulation of different pulse characteristics, that it, the pulses of one channel may be given a particular width modulation while pulses of another channel may be time modulated by a given frequency signal, the identifying signals all being different from or outside of the frequency band of the message or other type of intelligence with which the channel pulses are modulated.

The pulse modulation feature of the invention may be any known form so long as modulation limits are chosen so as to not interfere with pulses of adjacent channels or the channel identifying signals. The type of modulation, for example, may be one of several forms of P. T. M. (pulse time modulation), or P. A. M. (pulse amplitude modulation) or any combination of the different types of modulation so long as one does not interfere with another. By different forms of P. T. M. modulation, reference is made to "single" pulse time modulation with respect to a given time position or some pulse or pulses fixed in time position, and various forms of "double" pulse time modulation such as where the successive pulses of a given channel are time displaced from normal time positions in "push-pull" manner toward and away from each other. Another form of pulse time modulation known as P. W. M. (pulse width modulation) may also be used, the leading and trailing edges of the pulses being displaced relative to each other in the manner of "single" or "double" pulse time modulation, as the case may be.

By the term "pulse" applicants have reference to an electrical pulse of energy which may be modulated in one or more of its characteristics, such for example as its time position, width or duration, and amplitude. By the term "channel" applicants have reference to a channel of communication. More than one channel of communication may be transmitted simultaneously by means of the same pulses, the pulses being simultaneously modulated with more than one signal. "Channel" is also used in reference to transmitting and receiving channels in the transmitter and receiver, respectively.

The above and other objects and features of the invention will become more apparent upon consideration of the following detailed description to be read in connection with the accompanying drawings, in which:

Fig. 1 is a block diagram of a multi-channel communication system according to our invention;

Fig. 1A is a graphical illustration of multi-channel pulses used in explaining the operation of the system of Fig. 1;

Fig. 1B is a block diagram showing a radio link arrangement that may be used with the multi-channel communication system of Fig. 1;

Fig. 2 is a schematic diagram in perspective showing the multi-channel communicating system in the form of a radio broadcasting and relay system;

Fig. 5 is a schematic wiring diagram of a pulse width selector circuit of the character employed in receiving channels of the system;

Fig. 6 is a graphical illustration used in explaining the operation of the circuit of Fig. 5;

Figure 7:
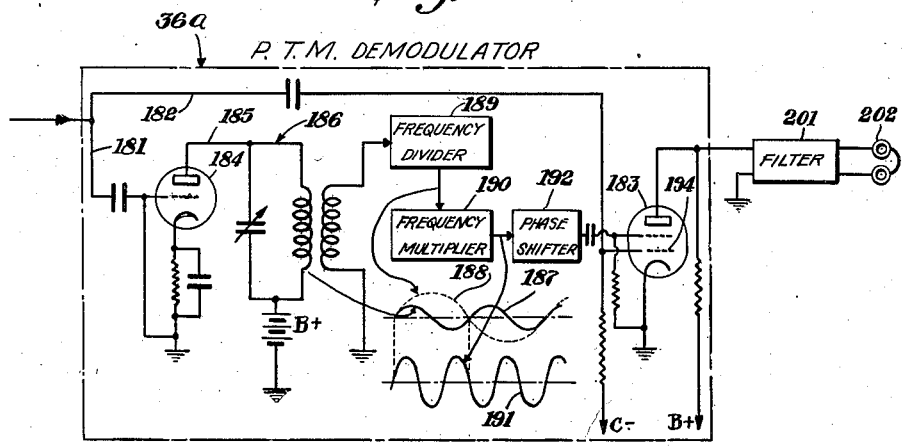
Figure 8:
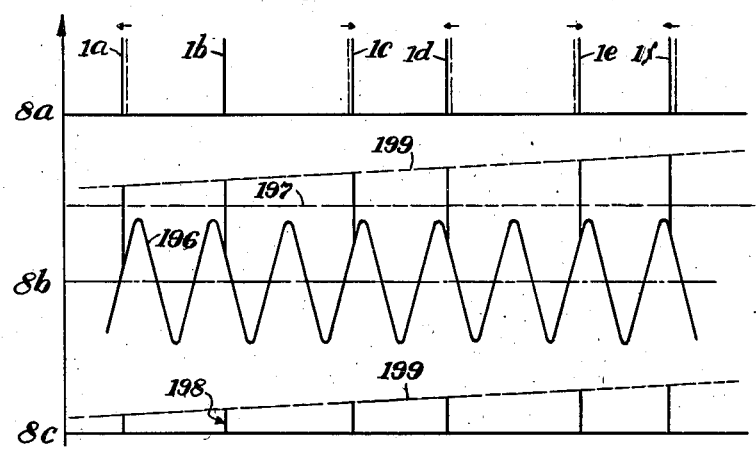

Fig. 7 is a schematic wiring diagram of a form of P. T. M. demodulator that may be employed in the receiving channels of the system;

Fig. 8 is a graphical illustration used in explaining the demodulating principle of the circuit of Fig. 7;

Fig. 9 is a block diagram of a modified form of multi-channel communication system;

Fig. 10 is a graphical illustration used in explaining the multi-channel principles employed in the system of Fig. 9;

Fig. 11 is a wiring diagram of a P. A. M. modulator;

Fig. 12 is a block diagram of a receiver adapted to select channels according to differences in amplitude of the pulses of different channels;

Fig. 13 is a further modification of the multi-channel communication system; and Fig. 14 is a graphical illustration of the P. F. M. modulation feature of the system of Fig. 13.

Referring to Fig. 1, a west terminal 10 is shown provided with a plurality of transmitting channels three of which are shown. The three channels include pulse time modulators 11, 12 and 13, respectively, and also pulse width shapers or modulators 16, 17 and 18, respectively. The timing of the pulse modulators 11, 12 and 13 is controlled by a base wave generator 20 which is connected directly to the unit 11 by connection 21 and through phase shifters 22 and 23 to the modulators 12 and 13, respectively.

The pulse modulators may be of any desired form depending upon the principle of modulation. For purposes of illustrating this invention, the pulse modulators herein shown are chosen of the "cusper" type used for "push-pull" P. T. M. described in detail hereinafter in connection with Figs. 3 and 4.

Figure 3:
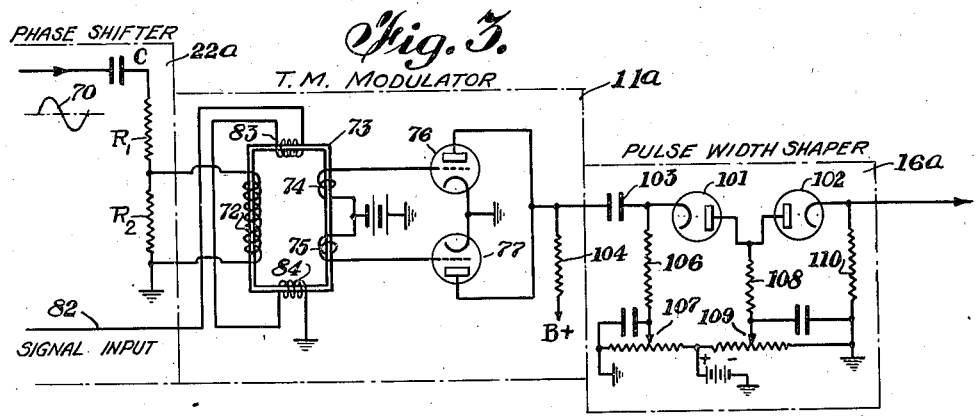
Fig. 3 is a schematic wiring diagram of the phase shifter, time modulator and pulse width shaper circuits for one of the channels of the system of Fig. 1.

The pulse width shaper circuits 16, 17 and 18 may be of any character suitable for translating pulses or cusps into pulses of a desired width. A circuit for effecting this purpose is also shown in Fig. 3. It will be understood, however, that the pulses may first be produced by a pulse generator circuit and thereafter modulated in time by intelligence signals.

In Fig. 1A, a train of pulses for channels 1 to 5, for example, is shown by curve a. It will be understood, of course, that a lesser number or a much greater number of channels may be employed. For example, as many as 100 or more channels may be provided depending, of course, upon the maximum pulse width employed, the time interval per channel period and the degree or character of the intelligence and channel identification modulations. The minimum width of pulses that may be employed is further determined by the band width permissible, the narrower the pulse the wider the band width required. Where differences in pulse width are relied upon for distinguishing the pulses of different channels, the differences in width from channel to channel may be in the order of one-hundredth of a microsecond. Thus, a hundred of different pulse width channels may be had with the maximum width within one microsecond duration.

As shown by curve a of Fig. 1A, the pulses of different channels are distinguished by pulse width, the pulse width shaper for each channel being adjusted to provide a pulse width different from the pulses of other channels. While the width of the channel pulses is shown to be progressively greater from channels 1 to 5, it will be understood that the identifying pulse widths may be mixed similarly as illustrated in Fig. 10 is that the wider pulses occur adjacent the narrower pulses, thereby economizing on the required spacing between channels where the centers of the adjacent channel pulses are equally spaced.

The train of channel pulses may be transmitted, as hereinbefore stated, by means of direct connection to the receiving terminals such, for example, as east terminal 30 by wire, coaxial cable, etc., or the two terminals may be interconnected by radio link as indicated by Fig. 1B. The train of transmitted pulses, for example, would be applied to an R.-F. translator 24 whereby the pulses are used for modulating a carrier wave of ultra high frequency for directional or omni-directional transmission, as the case may be. The receiving terminal or terminals would be provided with an R.-F. detector 34 for detecting the multi-channel pulse wave to video form. This detection applies channel pulses in video form, such as shown by curve 1a in Fig. 1A, to the receiving channels which are provided with width selectors 31, 32 and 33 and demodulators 36, 37 and 38, respectively. The width selector is of the character adapted to pass only those pulses of a selected width, that is, within close tolerance, and to reject all other pulses of different widths. A circuit of this character is illustrated in Fig. 5, the details of which are described hereinafter. This pulse width selection is illustrated by curves b and c of Fig. 1A, wherein the pulses of curve b are the pulses of channel 1 and the pulses of curve c are the pulses of channel 3.

With the pulses of the selected channel segregated from the train of transmitted channel pulses, the intelligence with which the pulses are modulated may be readily reproduced by a suitable demodulator. In the case of time modulation, a time demodulator of the character illustrated in Fig. 7, the details of which are described hereinafter, may be employed.

From the foregoing description, it will be clear that by the system of Fig. 1 a plurality of channels, each represented by a series of pulses modulated with a given identifying signal different from the identifying signals of the pulses of other channels, are produced. The pulses of each channel are timed with respect to the pulses of other channels to interleave and form therewith a single train of pulses for transmission over a common transmitting medium. Each of the separate series of channel pulses is modulated with intelligence separate from the identifying signal. The resulting train of channel pulses is transmitted either by direct connection or by radio link. Receiving circuits such as unit 34 or a combination of such units as indicated by the multiple receiving branches of terminal 30 are provided at one or more receiving points, either along the line of the direct connection or at various locations within the range of the radio link, whereby the pulses of any given channel may be selected and the others rejected so that the intelligence of a wanted channel may be obtained without requiring any special synchronizing arrangement between the transmitting and receiving points.

Fig. 2 illustrates further the radio link principle of the invention especially when used for broadcasting purposes. The system preferably employs omni-directional radiating antenna 50 mounted at a high point within a given populated area such as at the top of the highest building of a city or on a tower located at some other high elevation within the area. As shown in Fig. 2, the antenna 50 is mounted on a tower 51 located on the top of a tall building 52. The antenna 50 may be of any construction suitable for omni-directional radiation, one example being of the type disclosed in the patent to A. Alford No. 2,283,897.

Each channel of communication may be assigned to a particular studio located within the area of the broadcasting system and others may be assigned to certain national broadcasting chains. For purposes of illustration, five studios $1s$, $2s$, $3s$, $4s$ and $5s$ are shown associated with the main broadcasting station 52. All of the channels are broadcast in the form of pulses interleaved in a single train as shown in curve $a$ of Fig. 1A. This renders it possible to broadcast a plurality of different programs from one high point at a given carrier frequency so that receivers located within the range of the station may be equipped with directional antennas such as indicated at 54, for receiver 55, arranged in alignment with the antenna 50. This directional receiving antenna 54 may be fixed in position and the tuning for different programs effected by pulse width selection or other means of channel selection described hereinafter. The receiving antenna, of course, need not be directional but for best reception with a minimum of reflection interference from buildings and the like, the directional type will in most instances be preferred. Furthermore, the directional antenna need not be fixed on one broadcasting antenna but may be adjustable for alignment with other broadcasting sources.

In addition to the selective reception of the broadcast from station 52, the multi-channel transmission therefrom may be relayed by radio link through repeaters 61, 62, etc., to a second broadcasting tower 65 in another city. The tower 65 is provided with a similar omni-directional radiating antenna 67 whereby the multi-channel train of pulses is broadcast for local reception. Should the receiving antenna 66 of tower 65 be within visual alignment of the antenna 50, the repeaters 61 and 62 would not be required since the antenna 66 would, in that case, receive the broadcast directly from the antenna 50. It will be understood, of course, that the carrier frequency of the different broadcasting stations may be different where there might be overlapping of reception between the two broadcasting stations. Where the omnidirectional broadcasting stations are far enough apart that there is no overlapping, then the same carrier frequency may be employed but, in that case, a different frequency for successive repeater towers would be necessary as indicated by the frequencies $F_1$, $F_2$ and $F_3$. For further understanding of the radio link feature, reference may be had to applicants' copending application entitled "Broadcasting systems," Ser. No. 529,932, filed of even date herewith.

Fig. 3 shows the circuit of one form of P. T. M. modulator $11a$ such as may be employed at 11, 12 and 13, Fig. 1, together with a phase shifter $22a$ of the character used at 22 and 23 and a pulse width shaper $16a$ of the character that may be used at 16, 17 and 18. The phase shifter $22a$ comprises a condenser-resistor network $C-R_1R_2$, the relative values of which determine the phase shift of the base wave 70 applied thereto from base wave generator 20, Fig. 1. Assuming that there is no phase shift of the base wave 70 required as in the case of channel 1, Fig. 1, then the wave may be regarded as of the phase position indicated in curve $4a$ of Fig. 4 when applied to primary coil 72 of the coupling transformer 73.

The modulator circuit includes two secondary coils 74 and 75 coupled to the control grids of two vacuum tubes 76 and 77 in push-pull arrangement similar to a full-wave rectifier. The modulator amplifies and, in effect, full-wave rectifies the wave 70, curve $4a$, Fig. 4 to obtain a cusper wave 80, curve $4b$. Time modulation of the cusper wave is produced by applying the signal intelligence over input connection 82 to primary coils 83 and 84 on the transformer 73. The signal intelligence operates, in effect, to vary the wave 70 relative to its zero axis as regards the full-wave rectification. This relative variation between the wave and the zero axis thereof is illustrated in curve $4a$ by the upper and lower modulation limits 86 and 87. When the input signal varies the relative relation between the zero axis 67 and the wave 70 as indicated by limit 86, the cusper wave is displaced as shown by the broken line $80a$ and when displaced to the opposite limit 87 by broken line $80b$. It will be observed that the signal wave may vary the cusps 91, 92, 93 and 94 in push-pull manner toward and away from each other thereby decreasing or increasing the time interval between successive cusps.

For transmission purposes, the cusps are clipped from the wave and, if desired, may be shaped to form substantially rectangular pulses. Such a shaper circuit is shown at $16a$, Fig. 3. By providing each channel with a shaper circuit of this character, the pulses of each channel may be assigned an identifying width different from the width of other channels. The shaper $16a$ comprises a double diode clipping circuit wherein the plates of the two diodes 101 and 102 are connected together and the cathode of tube 101 is connected through coupling condenser 103 across the load resistor 104 of the modulator $11a$. The cathode of diode 101 is connected through a resistor 106 to a potentiometer 107. The plates of the two tubes are connected through a resistor 108 to a second potentiometer 109. The cathode of the tube 102 is connected through a resistor 110 to ground.

The two diodes 101 and 102 operate together as a gate clipper for clipping the cusper between limit levels 111 and 112, curve 4b, the width of the gate being controlled by the adjustment of potentiometer 107 and the position of the gate relative to the wave is controlled by adjustment of the potentiometer 109. The gate position of the clipping levels 111 and 112 on wave 80, curve 4b, for example, produces a pulse of the width $W_1$, curve 4d. The pulse of curve 4d is shown to be amplified, it being understood that the pulse width shapers 16, 17 and 18 may include one or more amplifying stages in addition to the double diode circuit shown at 16a in Fig. 3. By adjusting the potentiometer 109, the gate levels 111 and 112 may be shifted to positions 111a, 112a as indicated on wave 116, curve 4c. The wave 116 is identical to the wave 80 except that it is shifted in phase according to the values of the phase shifter 22a such as required by channel 2 or channel 3, as the case may be. A different adjustment of the potentiometer 109 for the wave 116 may provide a gate clipping at a much lower level than the gate positions 111 and 112 of curve 4b. This results in the pulse width $W_2$ which is greater than the width $W_1$. It will thus be clear that by proper adjustment of the potentiometer 109 at the pulse width shapers of the different channels that the pulses of the different channels will have different pulse widths thereby identifying the channel represented by such pulses.

For further understanding of the "cusper" type of modulator and the double diode clipping circuit, reference may be had to applicants' copending applications Serial No. 455,897, filed August 24, 1942, and Serial No. 437,530, filed April 3, 1942, respectively.

The phase adjustment of the wave 70 to position 70a, curve 4a, is indicative of the time control of the pulses of the different channels, the phase position of curve 70 represents the time control for the pulses of channel 1 while the phase position 70a represents the time control of the pulses of channel 2, for example, thereby producing a cusper wave 116 which is displaced in phase with cusper wave 80 so that the pulse outputs of the two waves are differently timed for interleaving as indicated by curve 4d.

As hereinbefore described in connection with Fig. 1A, the pulses of the different channels are identified by different pulse widths and are timed differently so that they interleave to form a single train of pulses as shown by curve a, Fig. 1A. This train of channel pulses is transmitted over a common transmission medium either in the form of a direct line connection or radio link to the east terminal in the case of a multi-channel communication system, or to separate receiver units constructed along the lines of each receiving channel of the terminal where the transmission is by radio link and the transmission is omni-directional as in radio broadcasting.

Figs. 5 and 6 illustrate a pulse width selector circuit of the character disclosed in applicants' copending application, Serial No. 487,072, filed May 15, 1943, that may be used in each channel receiver of the east terminal, or in individual receivers for selective reception of the channels where multi-channel broadcasting is performed. The circuit includes limit clipping stage 120 as an input coupler which limits all input pulses to substantially the same amplitude, and also inverts the input pulses from a positive polarity as indicated by the pulses of curve 6a to negative polarity as indicated by the pulses of curve 6b, Fig. 6. This output pulse energy from stage 120 is applied through a resistor R to a shock excitable L-C circuit 125. Connected across the tunable circuit 125 is a vacuum tube 130, the cathode 131 of which is connected to the input side of the circuit 125, while the anode 132 is connected to the opposite side 133 of the tunable circuit. The side 133 is also connected to a source of anode potential 134. The pulse energy, curve 6b, from the anode connection 128 is applied to the grid 135 of the tube 130 so as to block the conduction between the cathode 131 and the anode 132 while pulse energy is applied to the circuit 125. The undulations produced in the circuit 125 in response to pulse energy over anode connection 128 are taken off through a connection 140 for application to a threshold clipping amplifier stage 145. The bias on the grid 146 is controlled by adjustment of resistor 147. In the output 148 of stage 145 is a pulse width shaper 150 the operation of which is hereinafter described.

Assume for purposes of illustration, that the widths of the pulses of curves 6a and 6b correspond, respectively, to channels 1, 2, 3, 4 and 5 as indicated by the width reference characters $W_1$, $W_2$, $W_3$, $W_4$ and $W_5$. Assume also that the circuit 125 is tuned for selection of pulse width $W_3$. Curve 6c represents the output of the circuit 125 when the circuit is tuned for selection of pulse width $W_3$, illustrating the different output undulations for the different pulse widths of curve 6a. When the leading edge 151 of the pulse $W_3$ is applied at negative polarity as indicated by curve 6b to the circuit 125, an initial undulation 152 is produced which is normally followed by undulations 153, 154 and so on in the form of a damped wave. When the circuit 125 is tuned to a frequency the period of which is exactly twice the width $W_3$, the trailing edge 156 occurs where the initiated oscillatory energy crosses the zero axis from undulation 152 to undulation 153. Since the trailing edge 156 shock excites the circuit in the same direction at this point, the undulation 157 produced thereby in the circuit 125 adds algebraically to the undulation 153 to produce undulation 160. The next succeeding pairs of undulations produced by the leading and trailing edges of pulse width $W_3$ would normally tend to produce a negative undulation 161 which would continue as a damped wave as indicated at 162. The damping tube 130, however, eliminates the trailing oscillations 162 so that they do not interfere with the undulations produced by subsequent pulses applied to the circuit 125.

A pulse width less than pulse width $W_3$ such, for example, as pulse widths $W_1$ and $W_2$, will not produce maximum undulations as great as the undulation 160 for the tuning adjustment corresponding to pulse width $W_3$. This is illustrated by the undulations 171 and 172 produced in response to the pulse widths $W_1$ and $W_2$, respectively. The reason for this is readily apparent because the shock excitations produced by the leading and trailing edges of the pulses of lesser width than $W_3$ are in part opposed to each other as indicated by the broken lines associated with the undulations 171 and 172. The undulations 174 and 175 produced in response to the greater pulse widths $W_4$ and $W_5$ are likewise smaller than the undulation 160 since here again the oscillations produced in response to the leading and trailing edges of the greater pulse widths are in part opposed to each other so that the algebraic summation thereof is less than in the case of the undulations produced in response to pulse width $W_3$.

The threshold clipping stage 145 is adjusted to clip at a level 176 thereby obtaining and amplifying the crest portion 160a of the undulation 160 as indicated by curve 6d. The pulse shaper 150 is preferably of the character adapted to differentiate the pulse 160a producing the pulse shape 160b of curve 6e. The shaper also preferably includes a clipper stage for clipping the positive pulse portion of pulse shape 160b at level 178 thereby producing a narrow width pulse 160c synchronized in time to the pulse of width $W_3$. Thus, any time modulation applied to the pulses of width $W_3$ will carry through to the output pulse 160c which may be demodulated to an audio wave by the demodulator 36a of Fig. 7. It will also be readily apparent that by adjusting the tuning of circuit 125 to another frequency the period of which is twice the duration of any one of the other pulse widths of curve 6a, that a corresponding output pulse will be produced representing the pulses of the pulse width selected.

Figure 4:
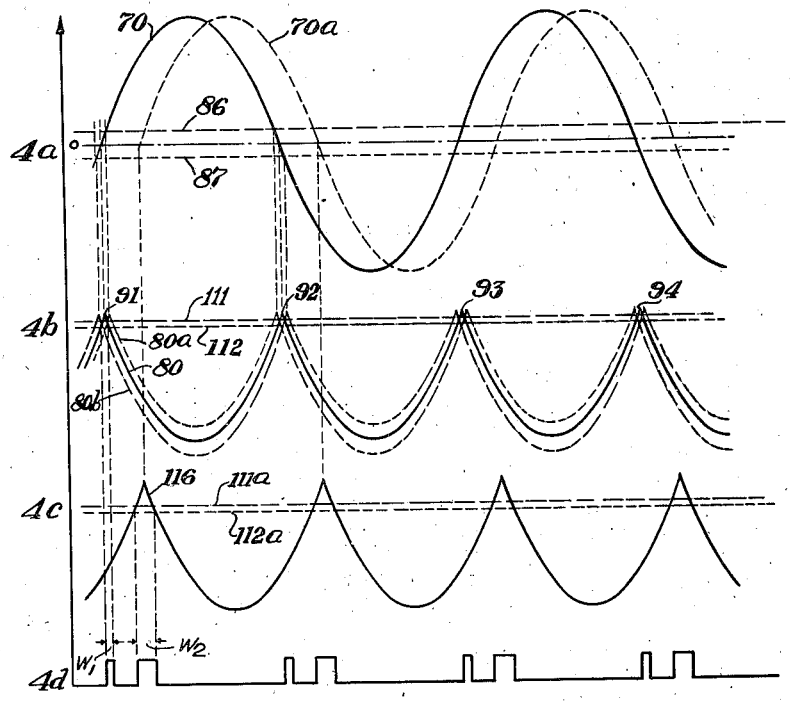
Fig. 4 is a graphical illustration used in explaining the operation of the circuit of Fig. 3.

Fig. 7 shows one form of P. T. M. demodulator that may be used as the demodulator at 36, 37 and 38 in the receiving channels in Fig. 1. The demodulator has two parallel input connections 181 and 182, connection 181 going to a coupling amplifier tube 184 and connection 182 to the control grid 194 of a demodulator or mixer tube 183. The output connection 185 of the tube 184 is applied to a resonant circuit 186 which is tuned to the repetition frequency of the pulses of the channel passed by the width selector 31, for example. The pulses from the tube 184 shock excite the circuit 186 into resonance at the tuned frequency producing an oscillatory wave 187. This wave is twice the frequency of the base wave 70 employed at the modulator (Figs. 3 and 4). To obtain a fundamental wave 188 corresponding to the wave 70, the wave 187 is applied to a frequency divider 189.

Either the wave 187 or the fundamental wave 188 may be used for demodulation purposes, but an odd harmonic of the fundamental wave 188 is preferred. It is also desirable, where the degree of T. M. is a small proportion of the period between pulses, that a high odd harmonic of the fundamental wave 188 be provided for demodulation in order to obtain an appreciable variation in amplitude for small changes in time displacement. The fundamental wave 188, therefore, is applied to a frequency multiplier 190, Fig. 7, whereby the desired odd harmonic wave 191 (see Fig. 7 and curve 8b Fig. 8), is obtained. While wave 191 is shown for purposes of illustration to be the third harmonic of the wave 188, a higher odd harmonic may be preferred in some cases.

A phase shifter 192 is provided in the output of the frequency multiplier to shift the demodulating wave in phase with respect to the T. M. pulses. The demodulating wave 192 is applied directly to the screen grid of the mixer tube 183 for translation of the time displacement of the pulses into amplitude modulated pulses.

For further understanding of the ramifications of the above-described demodulating principles, reference may be had to the copending applications of D. D. Grieg, Serial No. 459,959, filed September 28, 1942, and N. H. Young, Jr., Serial No. 517,160, filed January 6, 1944.

In Fig. 8, curve 8a represents the pulses of a particular channel selected for demodulation such as channel 1. The pulses of curve 8a are time displaced according to a linearly increasing signal input, the broken line positions indicating the normal timing of the pulses in the absence of a modulating signal. The grid voltage wave 196 of curve 8b indicates the harmonic wave 191 applied to tube 183 from the phase shifter 192. The resulting grid potential produced in the tube 183 by the inputs on grid elements thereof is indicated by curve 8b. The wave 196 represents potential energy of the selected odd harmonic wave 191 together with the pulses of curve 8a. The positions of the pulse potentials on the curve 196 are determined by the degree of time modulation of the pulses. For zero modulation as represented by input pulse 1b, a given grid voltage condition is produced. The time displacement, either forwardly or rearwardly with respect to this given grid voltage condition, controls the position of the pulse potentials on the slope of curve 196. For displacement due to a signal of negative polarity such as represented by the displacement of pulse 1a, the corresponding grid pulse potential in curve 8b assumes a lower position on the curve 196 than the grid pulse potential corresponding to pulse 1b the position of which represents zero modulation. For pulses having displacements due to signals of progressively greater positive polarity, such as pulses 1c, 1d, etc., the corresponding grid pulse potentials thereof in curve 8b occur at progressively higher points on the curve 196.

The bias on the control grid 194 of the tube 183 is selected so as to provide a threshold clipping level 197 which clears the amplitude of the wave 196. Thus, the output of the tube 183 comprises a train of pulses 198, wherein the pulses are modulated in amplitude according to the time displacement of the corresponding grid pulse potentials. The pulses of train 198 define an envelope 199 which corresponds to the signal energy at the transmitting station. By applying the amplitude modulated pulses of curve 8c to a suitable filter 201, the signal wave represented by envelope 199 is detectable on earphones 202.

In Figs. 9 and 10 another form of multi-channel communicating system is illustrated wherein the pulses of each channel are doubly modulated with intelligence in addition to the channel identifying signal. The double modulation of the pulses may be utilized to provide different tone effects on the same program or for other purposes such as television. Branch channel 1x intelligence may, for example, carry the sound effects produced at one microphone in the studio while branch channel 1y modulation carries the tone effects as received at a second microphone differently located from the first microphone. By segregating the two branch channels at the same receiver and applying them to different speakers, the desired tone effect will be reproduced. This dual tone transmission may be carried even further by adding additional branch channels on the same carrier pulses of a main channel or by utilizing a separate main channel such as branch channels 2x and 2y for conveying the tone effects produced at still additional points within the same or another studio to separate speakers at the receiving point.

The transmitting channels of the system of Fig. 9 are substantially the same as those illustrated in Fig. 1, like reference characters being used for like units. The output pulses of the pulse width shaper 16, for example, are fed to a P. A. M. modulator 200 which may be of the character shown in Fig. 11 hereinafter described. The pulses of main channel 1 are thus both modulated in time position and amplitude by the intelligence of branch channels 1x and 1y. Assuming that five main transmitting channels are provided at the transmitting terminal, the channel pulses would appear substantially as shown in curve 10a, Fig. 10. The channel pulses are shown to be amplitude modulated, the channel 1 pulses being further modulated in time displacement in push-pull manner relative to their normal positions shown in broken lines 204. Curves 10b and 10c illustrate the demodulation of the two different types of modulation for the pulses of channel 1.

While amplitude modulation has been added to the time modulation on the same pulses, it will be clear that other shape characteristics such as width and slope of leading and/or trailing edges may also be employed for other messages. In cases of amplitude and time modulation of the same pulses, some "cross-talk" may result unless the leading and/or trailing edges of the pulses are maintained substantially vertical. Such "cross-talk," however, can be greatly minimized by using a "peak riding clipper," or by differentiating the pulses at the input of the P. T. M. demodulator. Peak riding clippers are shown for this purpose in Fig. 9 and the receiver unit 265, Fig. 13.

It is also contemplated, where desirable, to use the P. A. M. modulators to apply identifying signals to the pulses of different channels. The P. A. M. modulators may be employed to give the pulses of each channel a distinguishing amplitude different from pulses of other channels similar to the identifying pulse width feature.

The train of channel pulses shown by curve 10a is transmitted either by direct line connection or by radio link to the receiving point or points. The east terminal is shown to be provided with two main receiving channels 1 and 2 each having two branch speakers. The receiving channel 1, for example, is shown to be provided with a pulse width selector 210 of the same character used in the receiving channels of the system of Fig. 1. The P. T. M. demodulator feature of channel 1 receiver is substantially the same as shown in Fig. 7, like reference characters designating corresponding parts. The output pulses of the selector 210 of a selected channel are applied to the base wave generator 214 which includes the circuits of units 184, 186 and 189 in Fig. 7, the base wave output 216 (curve 10b) corresponding to wave 188 in Fig. 7. The frequency multiplier 190 produces the desired harmonic, either even or odd, which is then applied through phase shifter 192 to the mixer 183. The demodulation of the pulses of channel 1 passed by selector 210 are clipped by peak riding clipper 212 and then demodulated in the same manner described in connection with curve 8b of Fig. 8. The time displacement of the pulses of channel 1 is according to a linearly decreasing signal as indicated by the envelope 220 defined by the pulse output of tube 183 operating at threshold clipping level 218. The filter 221 removes the pulses and applies the envelope wave to earphones 222.

As hereinbefore stated, the peak riding clipper 212 minimizes the "cross-talk" introduced into the time modulation channel by amplitude modulation of the same pulses. Variations in slope due to amplitude modulation are thus not carried into the mixer 183. The base wave produced by generator 214 is also used for producing deblocking pulses 225, curve 10c. The wave is adjusted for proper phasing by phase shifter 223, the phase shifted wave being clipped and suitably shaped at 224 and applied to a deblocking mixer 226 similar to mixer tube 183 of Fig. 7. The mixer 226 threshold clips at level 227 thereby providing a train of pulses which varies in amplitude according to the A. M. modulation at the transmitter. This pulse output is filtered at 229 whereby the pulses are removed and the envelope wave thereof applied to earphones 230.

Referring back to the P. A. M. modulator 200 of Fig. 9, Fig. 11 shows one type of circuit that may be used. It includes a grid controlled vacuum tube 240 to which T. M. pulses are applied over connection 241 and an audio signal wave is applied through to transformer 242 and resistor 243. The secondary coil 244 of the transformer is connected to a negative source of potential C— whereby the tube 240 is operated beyond cut-off. The audible signal wave varies the negative bias thereby altering, accordingly, the amplitude of the pulse conduction of the tube. The amplitude modulated output is indicated by pulse train 245.

Fig. 12 shows a receiver circuit along the lines of the "Discriminator circuit" disclosed in the copending application of D. D. Grieg, Serial No. 487,071, filed May 15, 1943, for selecting channel pulses when they are distinguished from channel to channel by different amplitudes. The train of channel pulses (1, 2, 3, 4 and 5) is first threshold clipped by clipper 245 at a level 245a just exceeding the amplitude of the pulse of the wanted channel such as channel 3. The clipper 245 preferably includes an amplifier stage arranged to invert and amplify the clipped pulse portions as indicated at 245b. The pulse train is mixed with the inverted pulses of wave 245b in mixer 246 whereby the inverted pulse portions substantially eliminate or at least reduce the amplitude of the pulses of amplitude greater than the wanted pulses to a lesser value. By threshold clipping the remaining pulses by clipper 247 at level 247a, the pulses of the wanted channel are thus obtained as indicated by wave 248. The clipper circuits 245 and 247 may be made adjustable for selection of different channels or they may be arranged to clip at predetermined levels for the selection of pulses of a given amplitude.

In Figs. 13 and 14 a further multi-channel communicating system is illustrated showing that another type of time modulation may be substituted for the time modulation of a channel heretofore disclosed and that the resulting pulses may also be amplitude modulated. This embodiment further demonstrates the use of channel identifying signals other than pulse width and also that both types of identifying signals may be used in the same multi-channel transmitting and receiving systems. The transmitting channels of the system of Fig. 13 are similar to the transmitting channels of Fig. 9, in fact, channel 3 is shown to be identical. Channels 1 and 2, however, differ in the type of modulation and channel 1 differs further in the type of channel identifying signal. Referring particularly to transmitting channel 1, the modulator is chosen to be an F. M. type of modulator. Any known frequency modulator such as the reactance oscillator type may be used for modulation of intelligence of branch channel 1x. The base or synchronizing wave for this type of modulation is produced by a stable type of wave generator 20 common to all of the transmitting channels the same as in Fig. 1. The base wave, however, is used for effecting proper phase control of the several channels so that the channel pulses will interleave in the manner heretofore described. The output of the F. M. modulator 250 is applied to a translator 252 of the multivibrator-shaper type whereby the frequency modulated wave is translated to pulse form in known manner. The resulting pulses are thus modulated with respect to their cadence or repetition rate according to the intelligence applied to the modulator 250. These pulses may be applied to a P. A. M. modulator 200 in the same manner shown in Fig. 11 whereupon the pulses are amplitude modulated according to the intelligence of a second branch channel 1y.

The pulses of main channel 1 are characterized by a channel identifying signal which is a frequency signal $f_1$ from source 251 preferably selected outside the frequency band of the intelligence applied over the branch channels. This identifying signal may be of a frequency tone within the band but, in that case, a filter must be provided to filter out the corresponding frequencies from the intelligence applied over the branch channel 1y and other channels employing this type of modulation in order to preserve the identity of the identifying signal.

Main channel 2 is also shown to have an F. M. modulator 255 but in this case the base or synchronizing wave applied thereto is shifted in phase by phase shifter 254 relative to the wave applied to the modulator 250 of main channel 1. The identifying signal for this channel is that of pulse width produced by the multivibrator-shaper 256, the multivibrator feature thereof being adjustable to produce pulses of a desired width. This pulse output may also be amplitude modulated by a separate branching channel 2y at 260.

The transmitting elements of the main channel 3 is the same as those of channels 1 and 2 of Fig. 9 and therefore need not be described.

The train of pulses produced by the three main transmitting channels is shown by curve 14b in Fig. 14. These pulses are translated to radio frequency at 264 for transmission to receiving units 265, 266, etc. Receiving unit 265 is shown to include an R.-F. detector 267 whereby the pulses are detected in video form as indicated by pulse train 268. These pulses are all applied to deblocking selector 269 which normally blocks the pulses except when a deblocking pulse is received from a generator 270. The generator 270 is adjusted to provide blocking pulses at a normal pulse timing slightly greater than the interval spacing of the pulses of any one channel. The pulses of the successive channels are passed by the deblocking selector 269, clipped by peak riding clipper 271 demodulated to audio by the demodulator 272. The signal filter 273, however, passes only the identifying signal, so that a selection rotation continues throughout the train of channel pulses until the proper identifying signal is received. Upon receipt of the identifying signal, the deblocking pulse generator is synchronized to the repetition rate of the pulses of that channel thereby locking the oscillator 270 into step, the selector 269 being thereafter deblocked in proper time as indicated by the deblocking pulses 271 for passage of the pulses only of the selected channel. Broken line 274 represents the cut-off level of selector 269. The filter 275 passes the audio of the intelligence demodulated by the P. F. M. demodulator 272 for reproduction on earphones 276. The same deblocking operation may be used for the second branching receiver circuit of the receiving unit 265. The pulses of channel 1 as shown at 278 are applied over line 290 to decoupler amplifier 291 and thence through filter 292 to earphones 293 for reproduction in the above manner.

From the foregoing, it is clear that an identifying signal other than pulse width and amplitude may be used for receiver selection of a particular channel from a train of channel pulses. Where the P. A. M. is used for modulation of intelligence, it may also be used for applying a given frequency signal for identification similarly as where such signal is applied to P. T. M. and P. F. M. modulators.

Receiver unit 266 is similar to the channel receivers of Fig. 9 except that an R.-F. detector 300 is shown, and the P. T. M. demodulator is replaced by a demodulator 302. This unit is provided with a pulse width selector 301 for selecting those channel pulses which differ in pulse width. Since the pulse width selector removes the amplitude modulation of the pulses as indicated by the pulse output thereof at 303, it is necessary therefore to provide a separate deblocking selector 304 similar to the deblocking selector 269 of unit 265, Fig. 13. A clipper-shaper circuit 305 is capable of producing a deblocking pulse from the wave produced by base wave generator 306 synchronized by the pulses of the selected channel. Phase shifter 314 insures proper phase for the deblocking pulses. Once the pulses are selected, their intelligence can be demodulated and reproduced on the phones 310 and/or 312, as the case may be. The channel selected by unit 266 according to width is shown at 303 to be channel 2, and the same channel is shown also selected by selector 304 according to curve 307, the type of selection here being such as to preserve the amplitude modulation as indicated at 309.

To illustrate further the fact that this type of time modulation may be applied to pulses in a multichannel system, the pulses of channel 1 in curve 14b are shown modulated according to the principles of this type of modulation by a signal wave 320 shown by curve 14a, Fig. 14. The limits of pulse displacement according to the principles of this type of modulation are selected so that the modulation will not interfere with the pulses of adjacent channels. The modulation of the pulses caused by the signal 320 is indicated by the broken line positions of the pulses of channel 1. Assuming that a normal interval of T exists between the pulses of channel 1 in the absence of modulation, then as a positive signal is applied as shown at point 321 on wave 320, the pulse corresponding to such instantaneous signal value will be spaced from the preceding pulse by an interval $T+\Delta t$. Should the signal value increase a corresponding amount from point 321 to 322, the interval between the channel pulses occurring at these two points is $T+2\Delta t$. At the next point 323 of pulse occurrence on the curve, the signal value is shown to be the same as at 322, therefore, the interval between points 322 and 323 will also be $T+2\Delta t$. A decrease in the signal value to pulse recurrence point 324 will decrease the interval proportionately as indicated by the interval $T+\Delta t$. Since the next pulse occurrence point 325 is substantially at zero signal value, the interval between points 324 and 325 will be T representing zero potential for the signal. A swing of the signal in the negative direction causes the intervals between pulses to decrease as shown for the negative portion 320a of the signal wave. During this oscillation of the signal wave, it will be noted that the pulse spacing causes the pulses to be displaced from normal positions throughout the cycle until the wave returns to the zero center line 340. By controlling the limits of signal swings or by limiting the degree of F. M. modulation of the base wave at the transmitter, the pulses can be maintained within the allotted limits between pulses of adjacent channels in the train of pulses.

It will be readily apparent from the foregoing description that our invention is applicable for transmission of a plurality of programs on the same carrier frequency and also that different programs or different parts of the same program (different sound effects, for example) may be carried by the same pulses; also that various types of pulse modulation and synchronizing signals may be employed. Further, while in existing broadcasting systems programs are generally transmitted for voice and musical programs, other types of intelligence may also be transmitted. For example, pulses may be transmitted in this manner as facsimile signals, the pulses being used directly as the facsimile build-up characters. The transmitted pulses may also constitute a sound track for television as well as synchronizing pulses required for controlling the line and frame scanning in facsimile and television transmission.

While we have described above the principles of our invention in connection with specific apparatus and particular modifications thereof, it is to be clearly understood that this description is made only by way of example and not as a limitation on our invention and the scope of the accompanying claims.

We claim:

1. A method of multi-channel communication comprising producing a separate series of pulses for each of a plurality of channels, modulating the pulses of each channel with a given identifying signal different from the identifying signals of the pulses of other channels, timing differently the pulses of the different channels to interleave the different series of pulses together as a single train of pulses for transmission over a common transmitting medium, modulating a characteristic of the pulses of each channel according to instantaneous signal values of an intelligence exclusive of the identifying signals of said channels, and transmitting said train of pulses over said transmitting medium; and, at a receiving point, segregating from said train those pulses having the identifying signal of a given channel, and demodulating the segregated pulses to obtain the intelligence with which they are modulated.

2. A method according to claim 1 wherein the identifying signal modulation of each channel includes width shaping the pulses of each channel to a width different from the width of the pulses of other channels.

3. A method according to claim 1 wherein the identifying signal modulation of each channel includes amplitude modulating the pulses of each channel to an amplitude different from the amplitude of the pulses of other channels.

4. A method according to claim 1 wherein the identifying modulation of each channel includes modulating the pulses of each channel with a signal of a frequency outside of the frequency band of the intelligence with which the channels are modulated and which differs from the frequency of the identifying signals with which the pulses of other channels are modulated.

5. A method according to claim 1 wherein the modulating operation includes modulating a first characteristic of the pulses of one channel according to one intelligence and modulating a second characteristic of the same pulses of said one channel according to another intelligence; and the demodulating operation includes demodulating the pulse energy of said given channel to obtain the intelligence with which the first characteristic thereof is modulated and further demodulating the pulse energy of said given channel to obtain the intelligence with which said second characteristic is modulated.

6. A method of multi-channel communication comprising producing a separate series of pulses for each of a plurality of channels, modulating the pulses of each channel with a given identifying signal different from the identifying signals of the pulses of other channels, timing differently the pulses of the different channels to interleave the different series of pulses together as a single train of pulses for transmission over a common transmitting medium, modulating with intelligence one characteristic of the pulses of a first channel, modulating with intelligence a second characteristic of the pulses of a second channel which is different from said one characteristic, and transmitting said train of pulses over said transmitting medium; and, at a receiving point, selecting the pulses of said first and said second channel from pulses of other channels according to their identifying signals, demodulating the pulses of said first channel according to one principle of demodulation to obtain the intelligence with which said one characteristic is modulated, and demodulating the pulses of said second channel according to a second principle of demodulation to obtain the intelligence with which said second characteristic is modulated.

7. A method of multi-channel transmission comprising producing a separate series of pulses for each of a plurality of channels, modulating the pulses of each channel with a given identifying signal different from the identifying signals of the pulses of other channels, timing differently the pulses of the different channels to interleave the different series of pulses together as a single train of pulses for transmission over a common transmitting medium, modulating a characteristic of the pulses of each channel according to instantaneous signal values of an intelligence exclusive of the identifying signals of said channels, and transmitting said train of pulses over a common transmission medium.

8. A method according to claim 7 wherein the transmitting operation includes translating the pulses of said train into carrier frequency pulses of a given frequency and transmitting said carrier frequency pulses.

9. A method according to claim 7 wherein the identifying signal modulation of each channel includes width shaping of the pulses of each channel to a width different from the width of the pulses of other channels.

10. A method according to claim 7 wherein the identifying signal modulation of each channel includes amplitude modulating the pulses of each channel to an amplitude different from the amplitude of the pulses of other channels.

11. A method according to claim 7 wherein the identifying modulation of each channel includes modulating the pulses of each channel with a signal of a frequency outside of the frequency band of the intelligence with which the channels are modulated and which differs from the frequency of the identifying signal with which the pulses of other channels are modulated.

12. A method according to claim 7 wherein the modulation operation for at least one of said channels includes modulating a first characteristic of the pulses of one channel according to one intelligence, and modulating a second characteristic of the pulses of said one channel according to another intelligence.

13. A method of multi-channel transmission comprising producing a separate series of pulses for each of a plurality of channels, modulating the pulses of each channel with a given identifying signal different from the identifying signals of the pulses of other channels, timing differently the pulses of the different channels to interleave the different series of pulses together as a single train of pulses, modulating with intelligence one characteristic of the pulses of one of said channels, modulating with intelligence a second characteristic of the pulses of a second of said channels, which is different from said one characteristic, and transmitting said train of pulses over a common transmitting medium.

14. A method of selectively receiving a given channel of communication from a multi-channel train of pulses wherein the pulses of each channel differ from pulses of other channels by a different identifying signal with which they are modulated, comprising segregating from the train of channel pulses those pulses having the identifying signal of said given channel, and demodulating the segregated pulses to obtain the intelligence with which they are modulated.

15. A method according to claim 14 wherein the pulses of one of said channels is doubly modulated, that is, a first characteristic of the pulses is modulated according to one intelligence and a second characteristic of the same pulses is modulated with another intelligence; and the demodulating operation includes demodulating the pulse energy of the doubly modulated channel according to one principle of demodulation to obtain the intelligence with which said first characteristic is modulated, and demodulating the pulse energy of said doubly modulated channel according to a second principle of demodulation to obtain the intelligence with which said second characteristic is modulated.

16. A multi-channel communication system comprising separate means for producing a series of pulses for each of a plurality of channels, separate means for modulating the pulses of each channel with an identifying signal different from the identifying signals of other channels, means controlling the separate pulse producing means to time differently the pulses of the different channels to interleave the different series together as a single train of pulses, means for modulating a characteristic of the pulses of each channel according to the instantaneous signal values of intelligence exclusive of the identifying signals of said channels, and means for transmitting said train of pulses over a common transmitting medium; and means, at a receiving point, for segregating from said train those pulses having an identifying signal at a given channel, and means to demodulate the segregated pulses to obtain the intelligence with which they are modulated.

17. A system according to claim 16 wherein the separate identifying signal modulating means includes means for width shaping the pulses of its respective channels to a width different from the pulse widths of other channels.

18. A system according to claim 16 wherein the separate identifying signal modulating means includes means for amplitude modulating the pulses of its respective channel to an amplitude different from the pulse amplitudes of other channels.

19. A system according to claim 16 wherein the separate identifying signal modulating means includes means for modulating the pulses of its respective channel with a signal of a frequency outside of the frequency band of the intelligence with which the pulses of such channel is modulated and which differs from the frequency of the indentifying signal with which the pulses of other channels are modulated.

20. A system according to claim 16 wherein the means for intelligence modulation of at least one of said channels of pulses includes means to modulate a first characteristic of the pulses according to one intelligence, and means to modulate a second characteristic of the same pulses with another intelligence; and the demodulating means at the receiving point includes means to demodulate pulse energy of the segregated pulses according to one demodulating principle to obtain the intelligence with which the first characteristic is modulated and means to demodulate pulse energy of the segregated pulses according to another demodulating principle to obtain the intelligence with which the second characteristic is modulated.

21. A multi-channel transmission system comprising separate means for producing a series of pulses for each of a plurality of channels, separate means for modulating the pulses of each channel with an identifying signal different from the identifying signals of other channels, means for modulating a characteristic of the pulses of each channel according to the instantaneous signal values of intelligence exclusive of the identifying signals of said channels means controlling the separate pulse producing means to differently time the pulses of the different channels to interleave them together as a single train of pulses, and means for transmitting the interleaved channel pulses over a common transmitting medium.

22. A multi-channel transmission system according to claim 21 wherein the transmitting means includes means to translate the train of pulses into carrier frequency pulses of a given frequency and means to transmit said carrier frequency pulses.

23. A multi-channel transmission system according to claim 21 wherein the separate identifying signal modulating means includes means for width shaping of the pulses of its respective channel to a width different from the pulse widths of other channels.

24. A multi-channel transmission system according to claim 21 wherein the separate identifying signal modulating means includes means for amplitude modulating the pulses of its respective channel to an amplitude different from the pulse amplitudes of other channels.

25. A multi-channel transmission system according to claim 21 wherein the separate identifying signal modulating means includes means for modulating the pulses of its respective channel with a signal of a frequency outside of the frequency band of the intelligence with which the pulses of such channel are modulated and which differs from the frequency of the identifying signal with which the pulses of other channels are modulated.

26. A multi-channel transmission system according to claim 21 further including means to doubly modulate the pulses of a given channel whereby each channel simultaneously carries two intelligence signals, the double modulating means comprising means to modulate a first characteristic of the pulses according to one intelligence signal and means to modulate a second characteristic of the pulses according to a second intelligence signal.

27. A system for selectively receiving a given channel of communication from a multi-channel train of pulses wherein the pulses of each channel differ from pulses of other channels by predetermined identifying signal modulation of some characteristic of the pulses and are further modulated according to the instantaneous signal values of intelligence exclusive of the identifying signal modulation, comprising means for segregating from the train of channel pulses those pulses of a given identifying signal, and means for demodulating the segregated pulses to obtain the intelligence with which they are modulated.

28. A system according to claim 27 wherein the characteristic of the pulses modulated by identifying signals is amplitude, and the means for segregating the pulses of a given channel from said train of multi-channel pulses includes means to eliminate those pulses of greater and lesser amplitude than the amplitudes of the pulses of said given channel.

29. A system according to claim 27 wherein the characteristic of the pulses modulated by identifying signals is width, and the means for segregating the pulses of a given channel from said train of multi-channel pulses includes means for passing pulse energy of a width according to the identifying pulse width of said given channel exclusive of the identifying pulse widths of other channels.

30. A system according to claim 27 wherein the characteristic of the pulses modulated by identifying signals is frequency signals exclusive of the frequency bands of the intelligence with which the pulses of said channels are modulated, selector means to pass successively for short intervals per channel the pulses of said channels for demodulation, means for demodulating the pulses passed by said selector means, and means responsive to the identifying signal frequency of a given channel for timing said selector means for passage only of pulses of said given channel.

31. A system according to claim 27 wherein the demodulating means is capable of separating two intelligence signals from doubly modulated pulses, the said demodulating means including means for modulating pulse energy of the doubly modulated pulses to obtain one of the intelligence signals and a second demodulator means for demodulating the pulse energy of said doubly modulated pulses to obtain the second intelligence signal.

32. A multi-channel receiving system for selective reception of channels wherein the channels are represented as a group by a train of interleaved pulses, the pulses of each channel differing from pulses of other channels by a given value of some characteristic thereof and in addition are modulated in some other characteristic, exclusive of the first-mentioned characteristic according to the instantaneous signal values of intelligence to be conveyed; comprising means to receive said train of pulses, and a plurality of branch circuits coupled in parallel to said means, each branch circuit having means for selectively segregating from said train those pulses of a desired channel and means for demodulating the segregated pulses to obtain the intelligence with which they are modulated.

EMILE LABIN.
DONALD D. GRIEG.

REFERENCES CITED

The following references are of record in the file of this patent:

UNITED STATES PATENTS

| Number | Name | Date |
|---|---|---|
| 2,036,350 | Montani | Apr. 7, 1936 |
| 2,057,773 | Finch | Oct. 20, 1936 |
| 2,257,795 | Gray | Oct. 7, 1941 |
| 2,275,224 | Henroteau | Mar. 3, 1942 |
| 2,181,309 | Andrieu | Nov. 28, 1939 |
| 2,227,108 | Roosenstein | Dec. 31, 1940 |
| 1,928,093 | Coyle | Sept. 26, 1933 |
| 2,048,081 | Riggs | July 21, 1936 |
| 2,185,693 | Mertz | Jan. 2, 1940 |
| 2,213,941 | Peterson | Sept. 3, 1940 |
| 2,282,046 | Goldsmith | May 5, 1942 |
| 2,311,021 | Blumlein | Feb. 16, 1943 |
| 2,326,584 | Van Zelst | Aug. 10, 1943 |
| 2,262,838 | Deloraine et al. | Nov. 18, 1941 |
| 1,655,543 | Heising | Jan. 10, 1928 |
| 2,113,214 | Luck | Apr. 5, 1938 |
| 2,256,336 | Beatty | Sept. 16, 1941 |
| 2,262,406 | Rath | Nov. 11, 1941 |
| 2,266,401 | Reeves | Dec. 16, 1941 |
| 2,308,639 | Beatty et al. | Jan. 19, 1943 |

FOREIGN PATENTS

| Number | Country | Date |
|---|---|---|
| 541,665 | Great Britain | Dec. 5, 1941 |